(12) United States Patent
Yamamoto et al.

(10) Patent No.: US 6,898,793 B1
(45) Date of Patent: May 24, 2005

(54) METHOD FOR CONTROLLING ACTIVATION OF AGENT AND COMPUTER

(75) Inventors: Gaku Yamamoto, Tokyo-to (JP); Yuhichi Nakamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/303,300

(22) Filed: Apr. 30, 1999

(30) Foreign Application Priority Data

May 1, 1998 (JP) .......................................... 10-122090

(51) Int. Cl.$^7$ ................................................ G06F 9/44
(52) U.S. Cl. ...................... 719/317; 718/104; 718/105
(58) Field of Search ............................... 709/200–253; 718/100–108; 719/317; 707/1–10

(56) References Cited

U.S. PATENT DOCUMENTS

| | | | | |
|---|---|---|---|---|
| 5,546,594 A | * | 8/1996 | Wazumi ..................... | 719/317 |
| 5,553,239 A | * | 9/1996 | Heath et al. ................ | 709/217 |
| 5,706,516 A | * | 1/1998 | Chang et al. ............... | 709/314 |
| 6,021,427 A | * | 2/2000 | Spagna et al. .............. | 709/206 |
| 6,128,657 A | * | 10/2000 | Okanoya et al. ............ | 709/224 |
| 6,185,619 B1 | * | 2/2001 | Joffe et al. .................. | 709/229 |
| 6,658,453 B1 | * | 12/2003 | Dattatri ...................... | 709/202 |

OTHER PUBLICATIONS

IBM Technical Disclosure Bulletin, Nov. 1989 vol. 32 Issue 6A pp. 1–2.*

* cited by examiner

Primary Examiner—Meng-Al T. An
Assistant Examiner—Charles Anya
(74) Attorney, Agent, or Firm—Rafael Perez-Pineiro; Anne Vachon Dougherty

(57) ABSTRACT

To control the load on an agent server, it is necessary to store any inactive agent in a secondary storage device, release a memory and a thread occupied by the agent, and control the number of simultaneously active agents. The agent server reads out an agent from the secondary storage device when a processing of the agent starts, and writes the agent into the secondary storage device when the processing of the agent is terminated. By doing so, the memory and the thread occupied by the agents which are not processing are released. It also limits the number of simultaneously active agents by starting a processing of another agent upon termination of the processing of one agent. In the present invention, the start and the termination of the processing are determined by the start and the termination of a conversation between the agents. Messages are in compliance with a predetermined rule. Accordingly, if this conversation rule includes definition of types of messages to the flow of messages exchanged in a series of processes, the start and the termination of a conversation can be detected by referring to the message and the conversation rule.

9 Claims, 11 Drawing Sheets

DESCRIPTION OF DEFINITIONS

```
DEFINE SESSION[FROM A TO B]
    HTTP REQUEST[A TO B]
        METHOD AS STRING
        PARAMETERS AS HASHTABLE
    HTTP RESPONSE[B TO A]
        CONTENTS AS STRING

DEFINE SESSION[FROM A TO B]
    REQUEST TRAVEL GOODS[A,B]
        REQUIRMENT AS QUERY TYPE
    PROVIDE EXACT GOODS[B,A]
        GOODS AS VECTOR<TOUR>
    RECOMMEND GOODS[B,A]
        GOODS AS VECTOR<TOUR>

DEFINE TYPE
    CATEGORY TOUR
        ATTRIBUTE AGENCY ID AS STRING
        ATTRIBUTE PRODUCT ID AS STRING
        ATTRIBUTE PRODUCT NAME AS STRING
```

MEANINGS OF DEFINITIONS

DEFINITION OF A SESSION[FROM AGENT A TO AGENT B]

A REQUEST FROM THE BROWSER[FROM AGENT A TO AGENT B]
THE ARGUMENT NAME IS METHOD AND TYPE IS STRING
THE ARGUMENT NAME IS PARAMETER AND TYPE IS HASHTABLE
A RESPONSE TO THE BROWSER[FROM AGENT B TO AGENT A]
THE ARGUMENT NAME IS CONTENTS AND THE TYPE IS STRING

DEFINITION OF A SESSION[FROM AGENT A TO AGENT B]

A REQUEST FOR TRAVEL GOODS [MESSAGE FROM A TO B]
THE ARGUMENT NAME IS REQUIREMENT AND THE TYPE IS QUERY TYPE
PROVIDING TRAVEL GOODS METING AND CONDITIONS [MESSAGE FROM B TO A]
THE ARGUMENT NAME IS GOODS AND THE TYPE IS VECTOR WHOSE ELEMENT IS TOUR
PROVIDING RECOMMENDED TRAVEL GOODS [MESSAGE FROM B TO A]
THE ARGUMENT NAME IS GOODS AND THE TYPE IS VECTOR WHOSE ELEMENT IS TOUR

DEFINITION OF A TYPE

THE TYPE NAME IS TOUR
   THE ATTRIBUTE NAME IS AGENCYID, THE TYPE IS STRING
   THE ATTRIBUTE NAME IS PRODUCTID, THE TYPE IS STRING
   THE ATTRIBUTE NAME IS PRODUCTNAME, THE TYPE IS STRING

FIG.4

DESCRIPTION OF DEFINITIONS

```
DEFINE GROUP
   NAME CONSUMER
   MAX ACTIVE AGENT 5
DEFINE GROUP
   NAME SHOP
   MAX ACTIVE AGENT 2
DEFINE ACTIVITY
   NAME SHOP A
   GROUP SHOP
   ACTIVE POLICY ON MEMORY
DEFINE ACTIVITY
   NAME SHOP B
   GROUP SHOP
   ACTIVE POLICY ON DISK
   TIMEOUT 15 SEC
DEFINE ACTIVITY
   CLASS COM.IBM.EPLACE.CONSUMER
   GROUP CONSUMER
   ACTIVE POLICY ON DISK
   TIMEOUT 30 SEC
```

MEANINGS OF DEFINITIONS

```
DEFINITION OF A GROUP
   GROUP NAME IS CONSUMER
   MAXIMUM NUMBER OF SIMULTANEOUS ACTIVITIES IS 5
DEFINITION A GROUP
   GROUP NAME IS SHOP
   MAXIMUM NUMBER OF SIMULTANEOUS ACTIVITIES IS 2
DEFINITION OF AN ACTIVITY
   AGENT NAME TO BE PROCESSED IS SHOP A
   GROUP IS SHOP
   CONSTANTLY ACTIVE
DEFINITION OF ACTIVITY
   AGENT NAME TO BE PROCESSED IS SHOP B
   GROUP IS SHOP
   ACTIVATES/DEACTIVATES
   TIME LIMIT OF ACTIVATION IS 15 SECONDS EACH TIME
DEFINITION OF AN ACTIVITY
   CLASS NAME OF THE AGENT TO BE PROCESSED —
   IS COM.IBM.EPLACE. CONSUMER
   GROUP IS CONSUMER
   METHOD OF ACTIVITY IS ACTIVATION/DEACTIVATION —
   30 SECONDS EACH TIME
```

FIG.10

METHOD FOR CONTROLLING ACTIVATION OF AGENT AND COMPUTER

FIELD OF THE INVENTION

The present invention relates to an agent technology, particularly to a method for controlling activations of the agent on an agent server and a mechanism therefor.

BACKGROUND OF THE INVENTION

In the field of online shopping on WWW (the World Wide Web), successful cases have been reported in several areas such as travel, books, CD (compact disk) and help-wanted information, and it is believed that more will develop from now on. The form of this online shopping is also shifting from that of simply displaying the goods such as conventional HTML (Hyper Text Markup Language) files or DB (DataBase) and CGI (Common Gateway Interface) to that of collectively browsing multiple sites or searching appropriate goods by learning a user's taste. This so-called "agent technology" is particularly well suited for such new forms of online interactions. For instance, an information retrieval agent for each user and an information provision agent for each company opening a shop are generated. Information retrieval and sale of goods can be performed by means of conversations between these agents. These agents may be mobile agents, but they must act together at least temporarily at one site (agent server). Since the information retrieval agents, whose number is equal to the number of users, are generated and each of them performs necessary information retrieval, the load on the server becomes heavier as the number of agents becomes larger. The server resources used by an agent are main storage device and threads. In case of the information retrieval agent, even more of the capacity of the main storage device will be required if the results of information retrieval are retained. Furthermore, since more companies are opening their "shops" and the number of information provision agents increases in accordance with increasing use of the agent servers, the load on the servers becomes even heavier. The information provision agent will also generally retain goods information in a database, and such database retrieval causes additional heavy loading.

As mentioned above, the load control of a server is a major problem. Accordingly, load has conventionally been reduced by decreasing the number of agents through storing inactive, non-processing agents in a secondary storage device such as HDD (Hard Disk Drive) inside the server. However, they are not stored in a secondary storage device by considering the exchange of messages between the agents. Alternatively, U.S. Pat. No. 5,706,516 mentions load control 110 which allows an administrator to define a number of valid tokens and which allows only an agent which has acquired a token to execute processing. Nevertheless, this patent does not control load considering the exchange of messages between the agents.

Meanwhile, to exchange messages between agents and make a conversation between them, there must be a common conversation rule between them. Accordingly, if a type database defining a conversation rule between agents is set up on a agent server (see: e.g., IBM Technical Disclosure Bulletin, Vol. 40, No. 12, p. 29 December, 1997) to generate an agent which outputs a message following the conversation rule, a conversation can be made on that agent server with other agents which also follow the conversation rule. It also may happen, however, that the agent server may have an agent which outputs messages which do not follow the conversation rule due to program errors (or purposely); or there may be an agent which outputs messages which have a bad influence on the system. There has been no countermeasure against such illegal or invalid agents.

Consequently, an object of the present invention is to control the load on an agent server. More specifically, the invention is directed to providing a method for controlling an activation/deactivation of an agent by examining messages.

Another object is to detect illegal or invalid agents and perform a countermeasure, by examining messages, to detect illegal or invalid agents which output illegal or invalid messages and to provide a method for deactivating such illegal or invalid agents.

Meanwhile, activating an agent means putting an agent in a state where it can perform processing, while deactivating an agent means storing an agent in a secondary storage device in a state where it can be reactivated, or in some cases discarding it.

SUMMARY OF THE INVENTION

To control the load on an agent server, it is necessary (1) to store inactive agents in a secondary storage device and to release memory and threads they occupied, and (2) to simultaneously control the number of active agents. The agent server reads an agent from the secondary storage device when processing for the agent starts, and writes it into the secondary storage device when the processing terminates. By doing so, it releases memory and threads occupied by any agents which are not actively processing. It also limits the number of simultaneously active agents by starting the processing of one agent after processing of another agent has been completed. In the present invention, the beginning and the ending of such processing are determined by the beginning and the ending of the conversation between the agents. As previously mentioned, the message follows the predetermined conversation rule. Accordingly, if this conversation rule includes provisions for types of messages and the flow of messages to be exchanged in a series of processes, it is possible to detect the beginning and the ending of the conversation by referring to messages and the conversation rule. By doing so, the beginning and the ending of processing can be detected.

It is possible to determine whether or not an agent is illegal or invalid by checking a content and a transfer frequency of the messages transferred by the agent. Since the content of the message must comply with the definition in the conversation rule, it must be an illegal or invalid agent if it transfers a message which is not defined in the rule or a message which is not in accordance with the flow of the conversation. It is also possible, by examining the messages, to detect whether it transferred more messages than the number allowed on a system within a certain period. By doing so, if the transmitting source is determined to be an illegal or invalid agent, the agent is deactivated. It is also possible to discard the agent.

The above is summarized as follows. A message is examined by referring to the conversation rule which defines usable messages. According to the examination result, a destination agent of the message is specified as an activation candidate agent. For instance, if the examination result is that the destination agent should be activated, it is specified as the activation candidate agent. Thus, by referring to the conversation rule, the load on the agent server can be controlled. There are also cases where an agent is not activated at once even if the message is valid and activation of the agent is required. For example, if a large number of agents are already active, activation of a candidate may be delayed. Thus, the activation candidate agent is activated by referring to the status of the agents in active.

In examining the messages, there are also cases where it is determined whether a message is intended to start a conversation by referring to a conversation rule defining usable messages and appropriate messages to start conversation between agents. By examining the message, it can be determined that it may not be necessary to newly activate an agent unless the message is intended to start a conversation in a flow of a conversation, even when the message is valid in the conversation between the agents.

It is also possible that the process of specifying the activation candidate agent includes a step of, if it is determined that the destination agent of the message should be activated by the examination result, requesting activation of the destination agent as the activation candidate agent and a step of determining whether or not the activation candidate agent can be activated.

It is also possible to deactivate the source agent of the message if the message is determined to be illegal or invalid as a result of the examination, if a source agent of a message which does not comply with the conversation rule is an illegal or invalid agent.

If a plurality of messages transferred from a second agent are examined and they do not meet predetermined conditions, it is also possible to deactivate the second agent. This invention can deal with cases where the second agent transferred more messages than the predetermined number, etc.

It is also possible to further include the process of specifying the source agent of the message as the deactivation candidate agent if it is determined that the source agent should be deactivated as a result of the examination. It is for the purpose of decreasing the load on the agent server by deactivating, in addition to any illegal or invalid agent, any agent which transferred a message indicating termination of the process based on the conversation rule.

It is also possible to further store an agent activity policy which defines possible activities for an agent, and activate and deactivate agents by referring to the agent activity policy. It is also possible, for instance, to set an agent activity policy which does not allow a specified agent to occupy memory and a thread for longer than a predetermined period, and to monitor the agent activity to determine whether or not the specified agent has been active longer than the predetermined period. Furthermore, it is also possible to set the agent activity policy such that an agent can be active constantly.

In addition, it is also possible to set an HTTP gateway which converts any hypertext transport protocol (HTTP) message from another computer to a message for an agent so that the message generated by converting the HTTP message is examined and a request for use of an agent corresponding to another computer is output. The foregoing is for the purpose of coping with cases where an agent and a user have a conversation using a browser.

While the flow of the processes of the present invention is explained as above, it may also be implemented in the form of a device which executes these processes or a program which has a computer execute these processes. This program may be stored on storage media such as a floppy disk or a CD-ROM or on other storage devices.

BRIEF DESCRIPTION OF THE DRAWINGS

The invention will now be described in greater detail with specific reference to the appended drawings wherein:

FIG. 4 is an example of description of a conversation rule;

FIG. 10 is an example of description of an agent activity policy DB;

DETAILED DESCRIPTION OF THE PREFERRED EMBODIMENT

Figure 1:
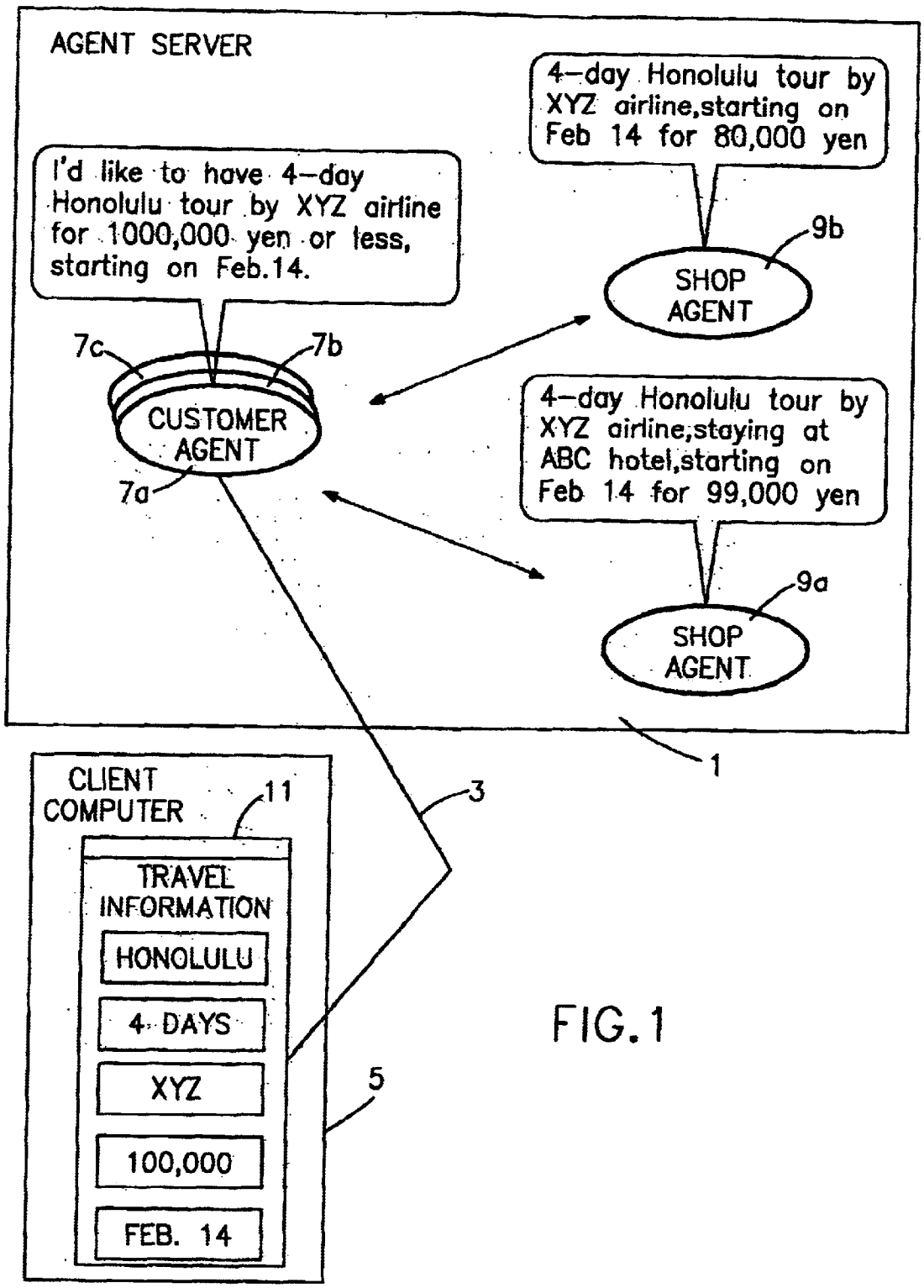
FIG. 1 is a conceptual diagram of the present invention.

This embodiment is explained by taking an example (FIG. 1) of the following system which provides travel information. On an agent server 1, shop agents, 9a and 9b of travel agencies which provide package tour information, are active. Users access the agent server 1 by using a web browser 11 of a client computer 5. If a user accesses it for the first time, a customer agent 7a for the user is generated on the agent server 1. In FIG. 1, the three customer agents 7a, 7b and 7c are present. A user of the client computer 5 generates the customer agent 7a in the agent server 1, and then inputs on the customer agent 7a a retrieval condition, "4-day Honolulu tour by XYZ airline for 100,000 yen or less, starting on Feb. 14" and has the retrieval started. The web browser 11 in FIG. 1 shows a status where the above retrieval condition is entered. This retrieval condition is entered on the customer agent 7a in the agent server 1 via a network 3. The customer agent 7a notifies each of the shop agents 9a and 9b of the entered retrieval condition as a message.

In response to this message, the shop agent 9a returns as a message to the customer agent 7a, "4-day Honolulu staying at ABC Hotel by XYZ airline for 99,000 yen, starting on Feb. 14." The shop agent 9b also returns as a message to the customer agent 7a, "4-day Honolulu by XYZ airline for 80,000 yen, starting on Feb. 14." In addition, the shop Agent 9b also returns as a message to the source agent 7a, information of recommended goods saying, "Only today, 4-day Honolulu by BCD airline for 50,000 yen, starting on Feb. 14."

The customer agent 7a collects such information so that a message of such a result is transferred to the web browser 11 as a result of retrieval. The web browser 11 presents the contents of the message of the retrieval result to the user. The user may apply for a desirable tour, if it is found, or enter a new condition on the web browser 11 and order it to retrieve again. It is also possible to generate the customer agent 7a every time the user accesses the agent server 1 and extinguish it when the connection ends. In addition, it is also possible to store the customer agent 7a for a predetermined period so that it is reactivated when the user seeks to access it again. It is also possible, in storing the agent, to store the past results of the retrieval altogether so that the past results are transferred to the web browser 11 when it is reactivated.

Figure 2:
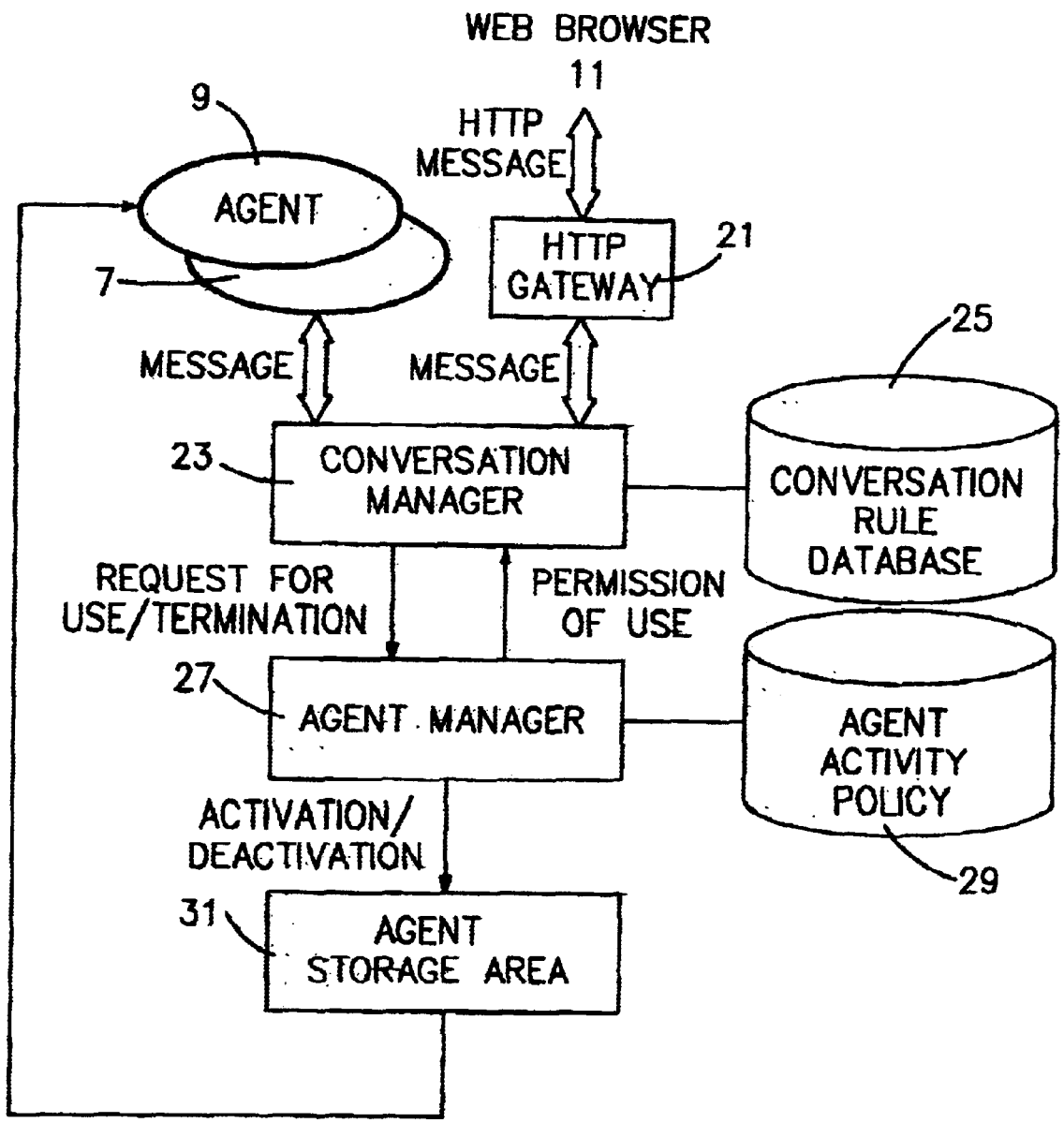
FIG. 2 is a diagram showing an example of configuration of an agent server in this embodiment.

The client computer 5 is a usual existing computer, and the present invention is primarily the configuration of the agent server 1. FIG. 2 shows an example of the configuration of the agent server 1. The agent server 1 comprises an HTTP gateway 21, a conversation manager 23, a conversation rule database (DB) 25 referred to by the conversation manager 23, an agent manager 27, an agent activity policy database (DB) 29 referred to by the agent manager 27, and an agent storage area 31 which is a secondary storage device.

Figure 3:
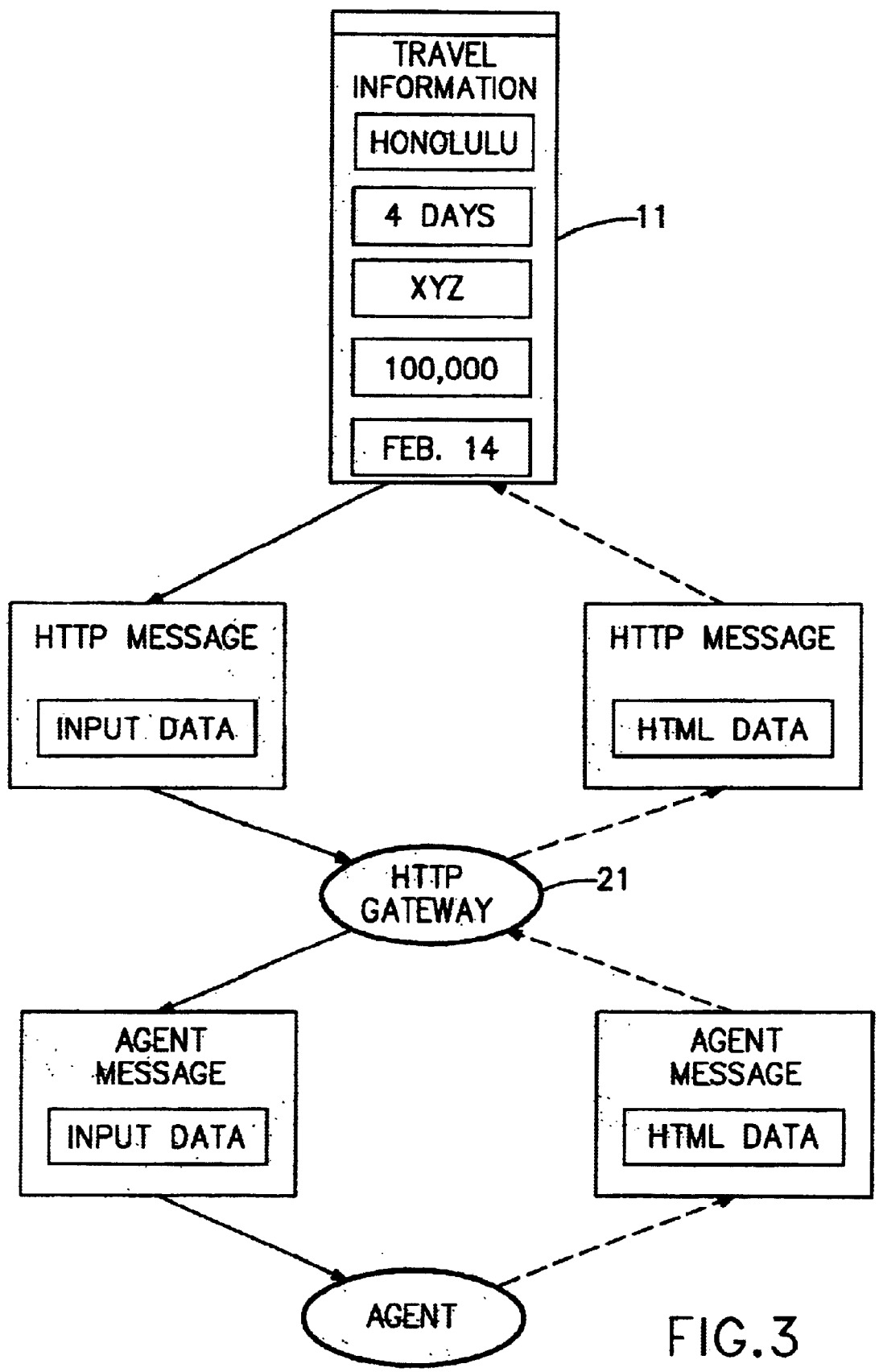
FIG. 3 is a diagram showing the process of an HTTP gateway.

The HTTP gateway 21 exchanges HTTP messages with the web browser 11 on the client computer 5. FIG. 3 shows an exemplary diagram to explain an operation of the HTTP gateway 21. If a user inputs data in input columns of the web browser 11 as in FIG. 3 and orders the transmission, an HTTP message is generated and output. For instance, it is a message, such as "http://www.tabican.ne.jp:987/search/AID=1234/search.html? mnopqr". In this case, the part of "www.tabican.ne.jp" is an IP (Internet Protocol) address of the agent server 1, and the part of "987" represents its communication port number. In addition, "AID=1234" is a corresponding customer agent number in the agent server 1, the message name is "search.html" and "mnopqr" represents input data. Such an HTTP message is converted to a message for an agent at the HTTP gateway 21. In FIG. 3, it looks as if messages were directly passed to the agent. However, it is only for the purpose of explaining the HTTP gateway 21, and as shown in FIG. 2, the message is passed to the conversation manager 23. On the other hand, if it is also necessary to output a message from an agent to the user, the message is converted by the HTTP gateway 21 to an HTTP message, including HTML data, and is then presented to the user by the web browser 11. In this embodiment, any message which requires its contents to be output to a user has its HTML data output by the agent itself. As regards the technology for the conversation with an agent by using the web browser 11, it is already a well-known technology as it is described in IBM TDB Vol. 40, No. 08, pp. 127–129, August, 1997.

The conversation rule DB 25 is a database to retain information of conversation rules observed between agents. A conversation is implemented by exchange of a series of messages, and a conversation rule defines the types of messages to be used, the arguments, the types of arguments, and also sequence of a series of messages. For instance, FIG. 4 shows descriptions of definitions on the upside and their meanings on the downside. In the case of FIG. 4, each session shows a message of the session's start on the top and that of its end at the bottom. The session is a series of messages exchanged for a conversation held between agents. As the HTTP gateway 21 is also handled as a special agent, Agent A on the left of the top session in FIG. 4 is an HTTP gateway 21 and Agent B is another agent.

The conversation manager 23 determines whether a conversation between agents is a valid one by referring to the conversation rule DB 25. That is, types of messages, arguments, types of arguments, and sequence of messages are checked as defined in the conversation rule DB 25. At this time, state transition of a conversation is retained by using a conversation management block. By this process, it is determined up to what number of messages have been transferred and what message is next to be transferred from which agent to which agent. If a proper message defined at the start of the session is received, a request for use of a destination agent is output to an agent manager 27. If permission to use an agent is received from the agent manager 27, a message is transferred to the destination agent of the message. If the agent is active and a proper message has been transferred, the message is transferred to the agent. On the other hand, if a proper message defining the received message at the end of the session is received, a notification of usage completion of the source agent is output to the agent manager 27.

Figure 5:
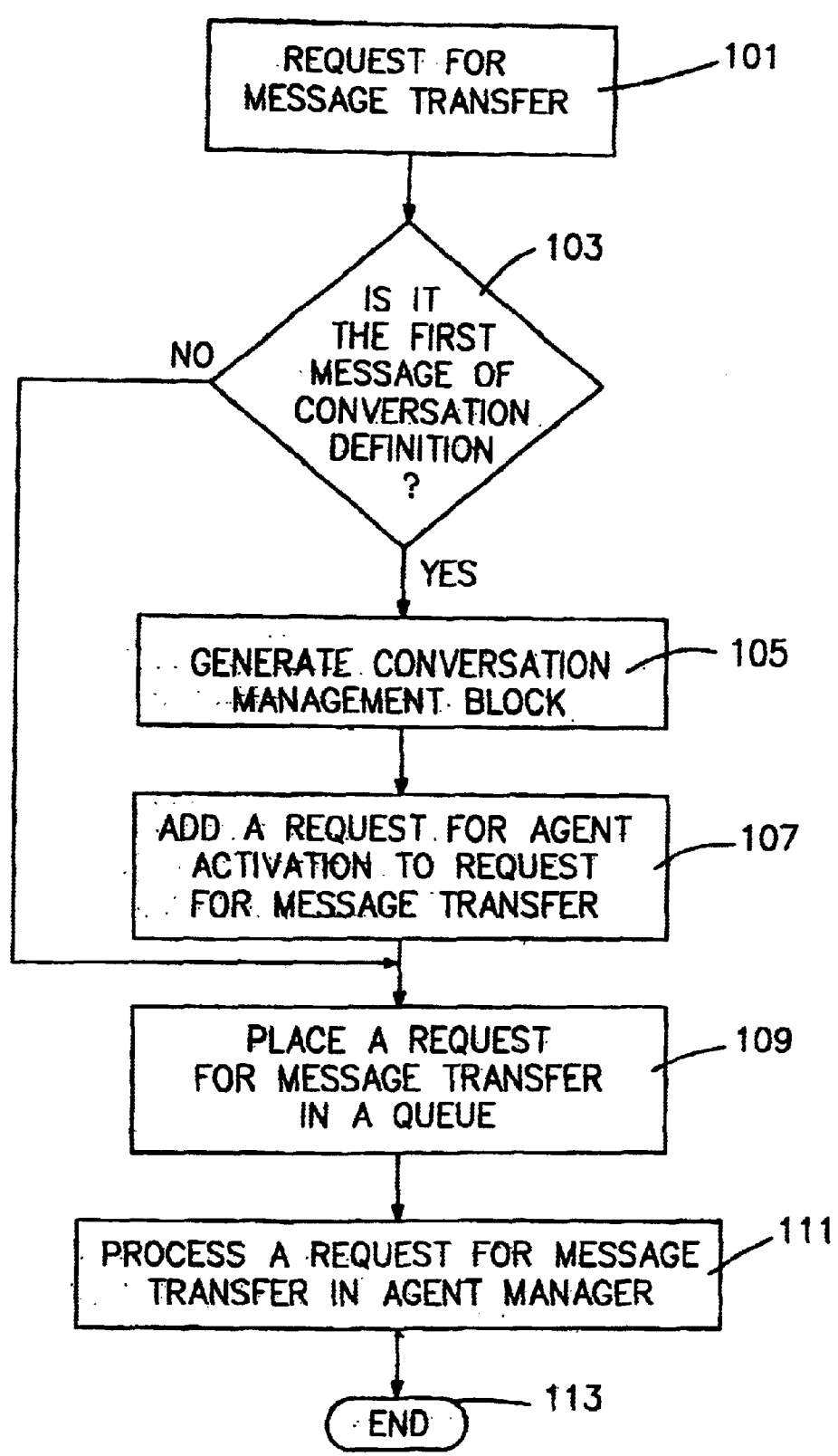
FIG. 5 is a flowchart of a request for the message transfer by a conversation manager.
Figure 6:
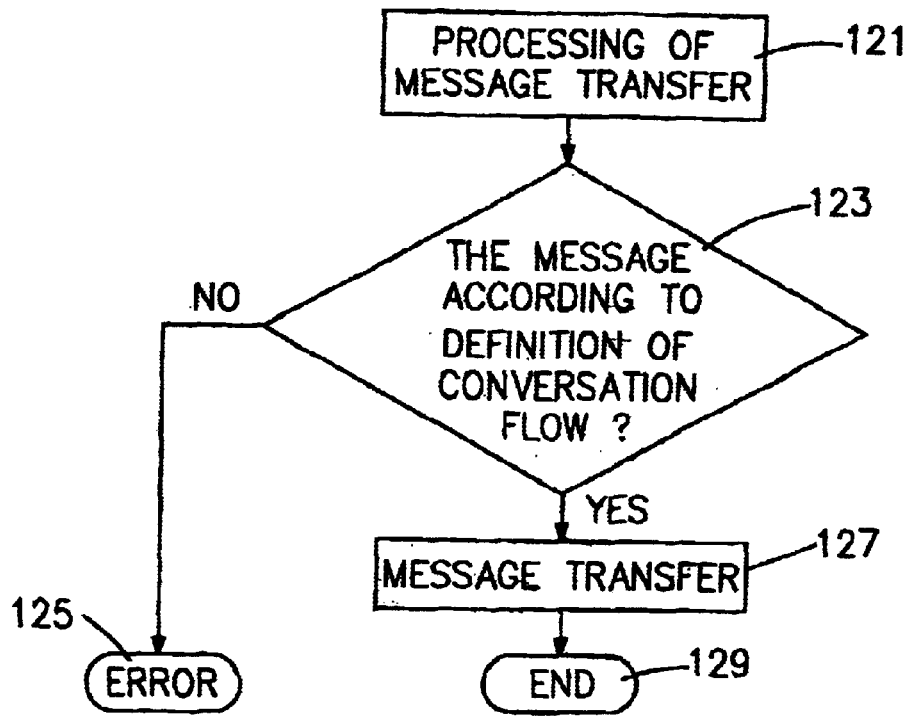
FIG. 6 is a flowchart of a message transfer.
Figure 9:
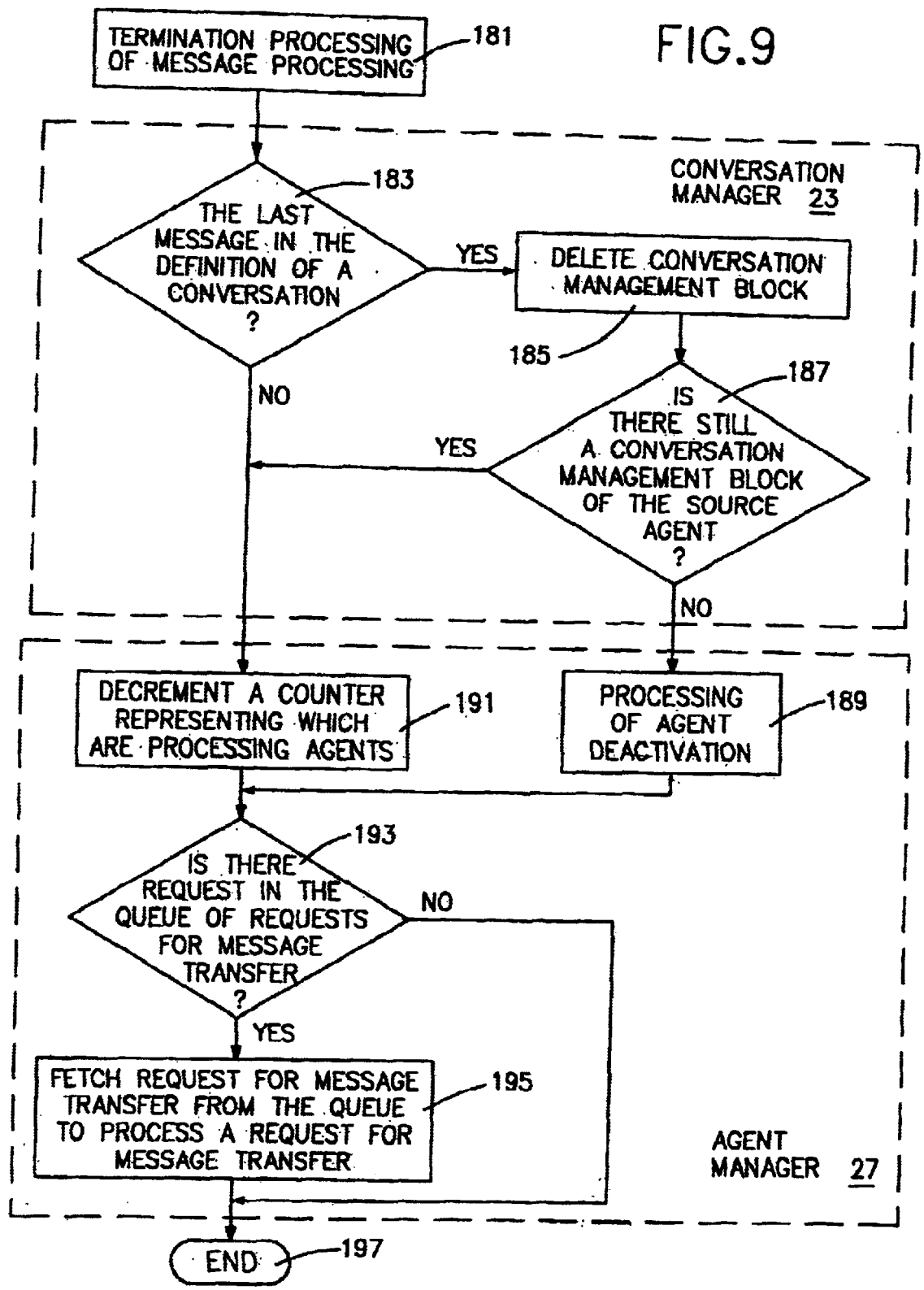
FIG. 9 is a flowchart of a termination of a message processing.
Figure 11:
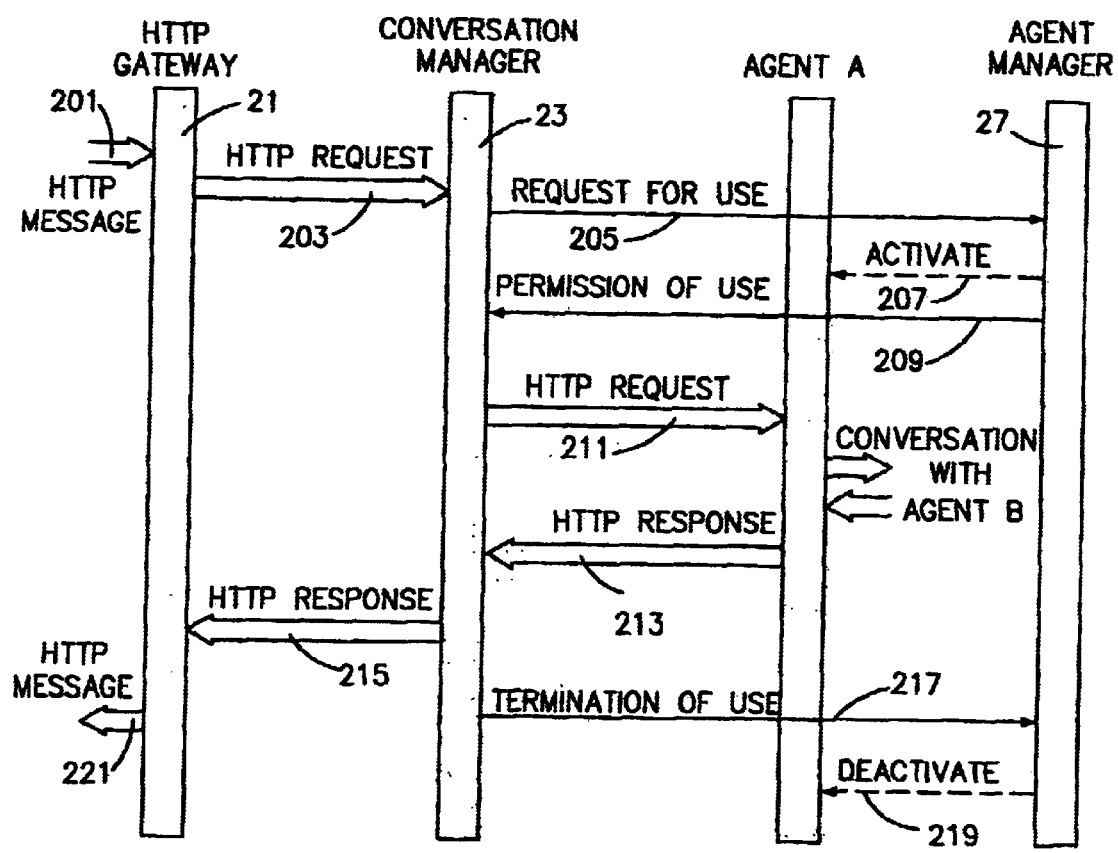
FIG. 11 is a diagram representing an example of processing of the entire system.

FIG. 5, FIG. 6 and FIG. 9 show processings of the conversation manager 23 in detail. FIG. 5 represents the processing of a request for transfer of a message to a certain agent. It is referred to as a request for transfer because, since every message is transferred via the conversation manager 23, receipt of the message is interpreted as a request for transfer by the conversation manager 23. Initially, it is determined whether the message is the first one in a conversation rule (step 103). If it is the first one in the conversation rule, the above-mentioned conversation management block is generated (step 105). Then, a request for agent activation is added to the request for a message transfer (step 107). A request for agent activation is a request for activation to a destination agent of the message, and the destination agent becomes an activation candidate agent. This request for the message transfer is placed in a queue (step 109). On the other hand, if it is not the first message in the conversation rule, steps 105 and 107 are skipped to jump to step 109 since the agent is already active and the conversation management block has already been generated. The request for the message transfer is processed by the agent manager 27 (step 111) as described later.

FIG. 6 represents a process of message transfer executed at the phase of message transfer in a process for a request for the message transfer by the agent manager 27. The first process of the message transfer is to determine whether the message is in accordance with the definition of conversation flow (step 123). If the message is not in accordance with the definition, it is processed as an error. For instance, measures are taken, such as deactivation of the source agent of the message. If, on the other hand, the message is in accordance with the definition, the message is actually transferred (step 127) and the process is completed. While, in this case, step 123 is used to determine whether the message is in accordance with the definition of conversation flow, it may also be determined altogether by step 103 in FIG. 5.

An agent activity policy DB 29 stores a schedule policy for each group of agents, such as "always activated" or "activated only during conversation". FIG. 10 shows an example. The upside provides descriptions of definitions and the downside their meanings. In this case, a maximum of five Consumer agents can be simultaneously active while two Shop agents can be active. The Shop A agent is always active while others may be deactivated. In addition, the Shop B agent can be active only for 15 seconds at a time while the Consumer agents can be active for 30 seconds. This agent activity policy DB 29 is referred to by the agent manager 27.

The agent manager 27 performs a scheduling and a processing of activation/deactivation of the agents by referring to the agent activity policy DB 29. Namely, it receives a request for use of an agent (a request for the message transfer with the request for the agent activation in FIG. 5) and a termination notification of use of an agent (as mentioned later, no conversation management block) from the conversation manager 23, and activates and deactivates them with appropriate timing by referring to the agent activity policy DB 29. Especially if only the number of the active agents is listed on the policy DB 29, it ensures that no more agents than the defined number should be activated.

Figure 7:
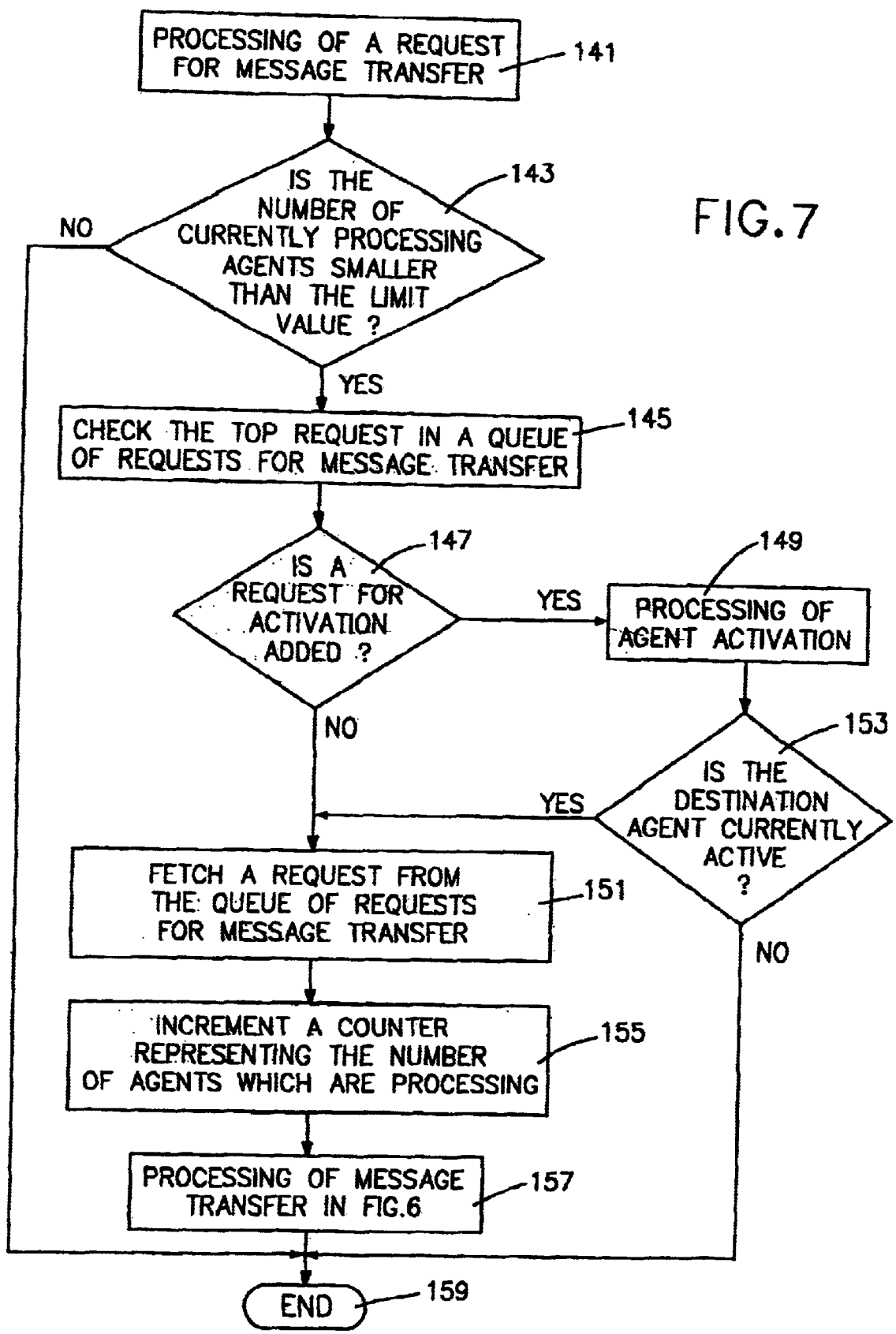
FIG. 7 is a flowchart of a request for the message transfer by an agent manager.

FIG. 7 shows the detailed process of step 111 in FIG. 5 representing the processing of the conversation manager 23, namely the processing of a request for message transfer by the agent manager 27. First, it is determined whether the number of currently processing agents is smaller than the limit value (step 143). The "processing agent" is an agent which actually receives a message and is processing it. The conversation manager 23 or the agent manager 27 is managing a counter for counting messages being processed for each agent in order to grasp the number of processing agents. For instance, if an agent is processing three messages, the counter for that agent shows 3. This step 143 uses a value calculated by adding all of the agents' counter values. Sometimes, the number of agents whose counter value is 1 or more is used. If it is smaller than the limit value in step 143, the top request on the queue of requests for the message transfer is checked (step 145). It is determined whether a request for the agent activation can be added to the top request (step 147). If a request for the agent activation is added to it, the agent activation process is executed (step 149). This activation process is illustrated in detail referring to FIG. 8. As easily understood from FIG. 8, an agent is not always activated in the process of agent activation. Accordingly, in this processing of a request for message transfer, it is confirmed whether the destination agent is currently active (step 153). If the agent is not active, the processing of a request for the message transfer in the agent manager 27 is terminated since the process of the message transfer (FIG. 6) cannot be executed (step 159).

If a request for agent activation is not added to the top request in step 141, and if the destination agent of the message is determined to be currently active in step 153, the top request on the queue of the requests for the message transfer is fetched (step 151). The aforementioned number of messages being processed by the agents (if one or more, it represents that the agents are processing them) is incremented by one (step 155). The process of message transfer shown in FIG. 6 is executed (step 157), then processing of the request for the message transfer in the agent manager 27 is terminated.

Meanwhile, in step 143, the process is terminated if the number of agents which are currently processing is equal to or larger than the limit value. The process in FIG. 7 is restarted from a process of FIG. 9 which is mentioned later, and it will successively process one after another of the top requests on the queue of requests for the message transfer.

Figure 8:
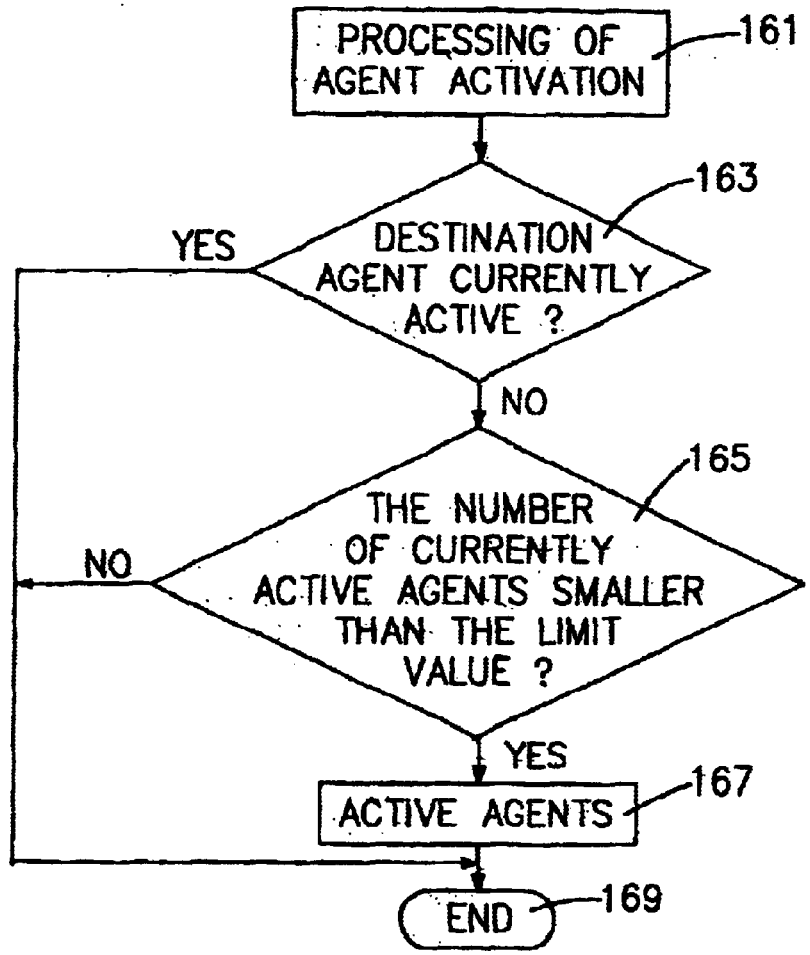
FIG. 8 is a flowchart of agent activation.

FIG. 8 shows the agent activation process which is in step 149 in FIG. 7. If the process moves to step 149 in FIG. 7, first of all it is determined whether the destination agent is currently active (step 163). If it is currently active, this process is terminated since it is not necessary to reactivate the agent (step 169). On the other hand, if the agent is not active, it is determined whether the number of currently active agents is smaller than the limit value (step 165). This number of the currently active agents is different from the number of the currently processing agents, since there may be agents which are not currently processing a message even though they are active. The process is terminated without activating the agents if the number is equal to or larger than the limit value (step 169). On the other hand, if it is smaller than the limit value, the agent is activated (step 167) and the process is terminated.

Thus, in the present invention, the number of the currently processing agents is also managed, due to the face that the processing load on a system is caused by not only activation of the agents but also by the fact that the agents are actually processing messages. For instance, if a shop agent accesses a secondary storage device for the purpose of retrieval of commodities DB, this process often overlaps with another shop agent's process. Accordingly, management of not only the number of the activated agents but also that of the number of the currently processing agents is very important.

Next, a process of terminating the message processing is explained by using FIG. 9. A part of FIG. 9 is performed by the conversation manager 23, and the rest by the agent manager 27. This process is started by an agent terminating the process of one message and then transferring a message for the process termination. At step 183, it is determined whether this message for the process termination is the last message in the definition of the conversation. If it is the last message in the definition, a conversation management block related to this message is deleted (step 185). It is determined whether the conversation management block of a source agent still exists (step 187). If the source agent is processing any other messages, it moves to step 191 since there remain conversation management blocks for other messages. On the other hand, if there are no more conversation management blocks, the agent manager 27 is so informed so that it can perform deactivation of the agents (step 189).

Meanwhile, if it is determined that the message is not the last message in the definition of the conversation in step 183, and if it is determined that the conversation management block still exists in step 187, the counter representing that the agent is currently processing is decremented by one (step 191). This makes the load on the system lighter so that, if there exists any unprocessed request in the queue of requests for message transfer (step 193), one is fetched from the queue and a request for the message transfer in FIG. 7 is executed. If there is no such request, then the process is terminated (step 197).

The deactivation may start on its own by the agent manager 27 by referring to the agent activity policy DB 29. There are also cases where the agent manager 27, on simultaneously receiving a number of messages representing start of a conversation, sequentially activates agents by temporarily deactivating currently active agents and then transfers messages. For instance, if five agents are already active in an environment where five agents as a whole can be active, transfer of a message by any agent to an inactive agent makes it impossible to newly activate an agent. Therefore, in this case, temporary deactivation of one agent may be performed. Also, if and agent can be active only for 15 seconds at a time as in FIG. 10, a timer is started on activation and the deactivation process is executed when 15 seconds elapsed. In addition, if the conversation manager 23 detects an illegal or invalid message, it requests that the source agent of the message be deactivated.

A serialization of objects or its reverse may be used for the processes of actually activating and deactivating agents. For instance, an example of implementation methods is mentioned in "Pickling State in the Java Systems" (The 2nd USENIX Conference on Object-Oriented Technologies, 1966).

While the examples of processing shown in FIG. 5 to FIG. 9 respectively indicate sharing of the processes by the conversation manager 23 and the agent manager 27, it is possible to transform them so that both managers execute the processes in FIG. 5 to FIG. 9 as one. It is also possible to implement the conversation manager 23 and the agent manager 27 as one, thereby, executing as one the processes in FIG. 5 to FIG. 9.

The whole flow of processing is explained by applying the example taken in FIG. 1 to FIG. 11 and FIG. 12. A user outputs an HTTP message 201 from a client computer 5 in order to retrieve "4-day Honolulu tour by XYZ airline for 100,000 yen or less, starting on Feb. 14." This HTTP message 201 is converted to an HTTPRequest message 203 and is output to a conversation manager 23 by an HTTP gateway 21. The conversation manager 23 determines this message to be the start of a session by referring to a conversation rule DB 25. Then the conversation manager 23 outputs a request for use of an agent (a request for agent activation) 205 to an agent manager 21. The agent manager 27 activates an Agent A, with a timing when it is possible (207), and outputs permission to use (transition to the process of message transfer: step 157 in FIG. 7) 209 to the conversation manager 23. Once the permission is granted, the conversation manager 23 outputs an HTTPRequest 211 to an Agent B.

Figure 12:
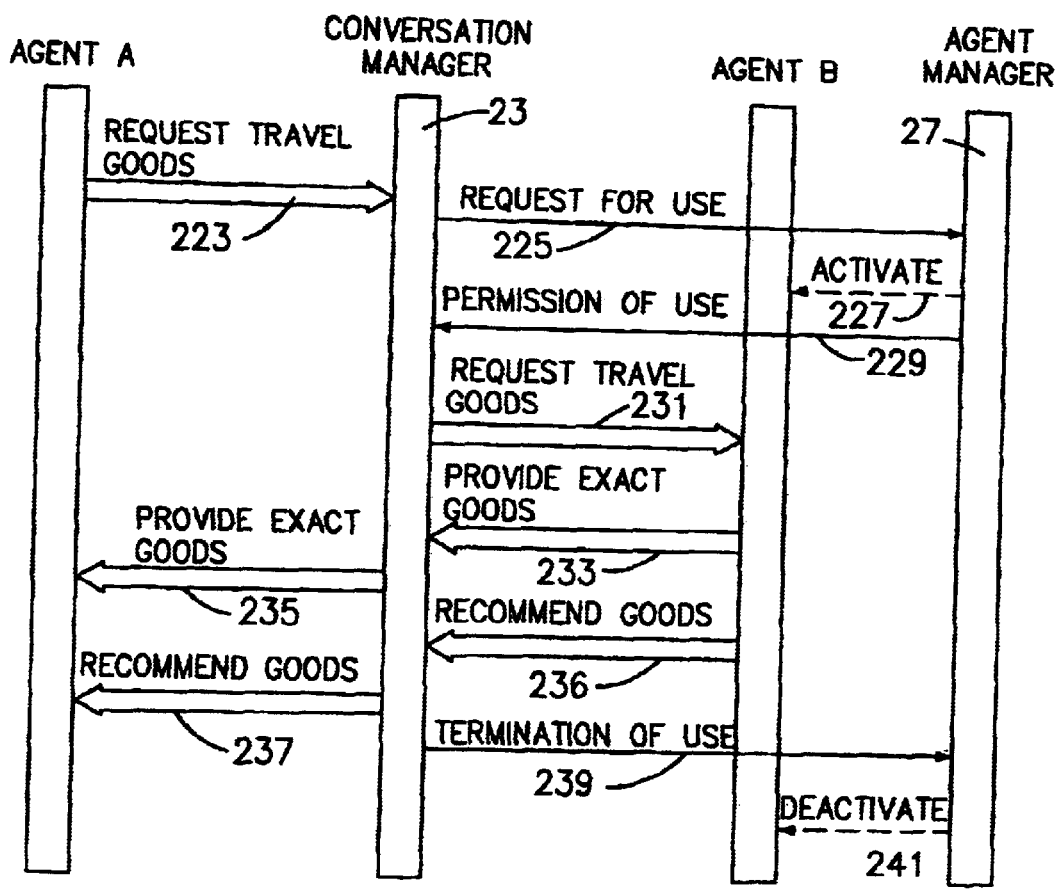
FIG. 12 is a diagram representing an example of processing of the entire system.

FIG. 12 is used to explain the following. At Agent A, a RequestTravelGoods message 223, whose argument is a retrieval condition within the HTTPRequest 211, is output to the conversation manager 23. The conversation manager 23 determines this message 223 to be a start of a conversation with Agent B by referring to the conversation rule DB 25, and outputs a request for use of Agent B to the agent manager 27. The agent manager 27 activates Agent B with appropriate timing and outputs a notification of permission for use 229 to the conversation manager 23. Then, the conversation manager 23 outputs a RequestTravelGoods message 231 to Agent B. Agent B processes this message 231 and, as a response to it, outputs to the conversation manager 23 a ProvideExactGoods message 233 whose content is "4-day Honolulu by XYZ airline for 80,000 yen, starting on Feb. 14." The conversation manager 23 determines whether this message 233 is proper, including its sequence, argument, etc. by referring to the conversation rule DB 25, and if it is proper, outputs it to Agent A as a ProvideExactGoods message 235. In addition, Agent B outputs to the conversation manager 23 a RecommendGoods message 236 on recommended goods information whose content is "Only today, 4-day Honolulu by BCD airline for 50,000 yen, starting on Feb. 14." The conversation manager 23, by referring to the conversation rule DB 25, determines the message 236 to be a message representing the end of the session. If the message is in compliance with the conversation rule, it outputs a RecommendGoods message 237 to Agent A and notifies the agent manager 27 of the end of use of Agent B (no conversation management block: steps 187–189 in FIG. 9) 239. The agent manager 27 refers to the activity policy DB 29, and deactivates Agent B if it is an agent to be deactivated (241).

Returning to FIG. 11 again, Agent A, having acquired necessary information, executes a process to output retrieval results to the user. So, it outputs the HTTPResponse message 213 to the conversation manager 23. The conversation manager 23 determines this message 213 to be the last message of the session of Agent A and the HTTP gateway 21 by referring to the conversation rule DB 25. Then the conversation manager 23 notifies the agent manager 27 of the end of use of Agent A (217). It also outputs the HTTPResponse message 215 to the HTTP gateway 21. The agent manager 27 refers to the activity policy DB 29, and deactivates Agent A if it can be deactivated (219). The HTTP gateway 21 converts the HTTPResponse message 215 from the conversation manager 23 to the HTTP message 221 and outputs it. Thus, the client computer 5 displays on the web browser 11 the retrieval results ordered by the user.

While the embodiment is explained as above, various transformation of the present invention is possible. For instance, it is possible to have a conversation manager 23 include a conversation rule on its own or likewise, to have an agent manager 27 include provisions of an agent activity policy on its own. As aforementioned, it is also possible to unify the conversation manager 23 and the agent manager 27. Furthermore, while an HTTP gateway 21 has a prerequisite that an HTTP is being used, it can be a gateway with another protocol in case another protocol is used. Also, while the HTTP gateway 21 is defined as a special agent, it is possible to define it not to be an agent in a conversation rule DB 25. It is also possible to provide a plurality of the HTTP gateway 21. Moreover, while an agent storage area 31 is supposed to be a hard disk as a secondary storage device, it can be another storage device. However, it is better not to use the main storage device for active agents. It was explained that a queue of requests for the message transfer should be used, but it is also possible to set up a queue of agents waiting for activation in the agent manager 27.

If an illegal or invalid agent is detected, it is desirable to deactivate it. It is possible, as deactivation, to extinguish it or to tag it as an invalid agent and store it like a valid one in the agent storage area 31 to be analyzed later. It is also possible, after examining a plurality of messages, to determine an illegal or invalid agent, for instance, judging from unusually high frequency of message transfer. It is also possible to relax the conditions so that it is decided to be an illegal or invalid agent if there are a plurality of invalid messages. Moreover, as regards the conversation rule, FIG. 3 is merely an example and other rules may be freely defined. In simplifying a conversation, it is obviously possible not to define a RecommendGoods message.

Having thus described our invention, what we wish to patent is:

1. A method for a server to control the activities of agents in a single server system having, in at least one storage location, a plurality to stored deactivated agents which can be activated, said method comprising the steps of:
   examining a message generated by a first source agent and addressed to a destination agent by referring to a conversation rule defining usable messages for said single server system, wherein said examining step determines whether said message is invalid and if said message is invalid, requesting the deactivation of said first source agent of the said message and deactivating said first source agent in response to said request;
   otherwise, if said message is valid, specifying the destination agent for handling said message as an activation candidate agent based on the said examining step;
   referring to the status of active agents; and
   retrieving said activation candidate agent from said at least one storage location and activating said activation candidate agent if said referring to the status of active agents indicates that the activation candidate agent can be activated.

2. The method according to claim 1, wherein said examining step comprises a step of: examining whether the message is for starting said conversation by referring to a conversation rule defining usable messages and messages to start the conversation between agents.

3. The method according to claim 1, wherein said specifying step comprises the steps of:
   if it is determined that the destination agent of said message should be activated according to said examination result, requesting activation of said destination agent as an activation candidate agent; and
   determining whether or not said activation candidate agent can be activated.

4. The method according to claim 1, further comprising the steps of:

examining a plurality of messages transferred from a second source agent; and deactivating said second source agent if said plurality of messages do not meet any predetermined conditions.

5. A computer comprising a server having a plurality of stored agents, which can be activated:

at least one storage device for storing a conservation rule which defines usable messages and for storing deactivated agents;

a message examination program for examining at least one message directed to an inactive destination agent from a source agent by referring to said conservation rule, wherein said message examination program determines whether said at least one message is invalid by referring to said conversation rule, and if said at least one message is invalid, requesting deactivation of said source agent of said at least one message and deactivating said source agent by an agent management program in response to said request; and if said at least one message is valid, requesting said agent management program to retrieve and activate said inactive destination agent from said at least one storage device, retrieving and activating said inactive destination agent by said agent management program in response to said request.

6. The computer according to claim 5, wherein said conversation rule defines messages to start conversation between agents.

7. The computer according to claim 5, wherein said at least one storage device further stores an agent activity policy which defines possible activities of agents; and said agent management program activates and deactivates the agents by referring to said agent activity policy.

8. The computer according to claim 5, wherein said computer is connectable to a network, and further comprises an HTTP gateway program for converting a hypertext transport protocol (HTTP) message from another computer to a message for agents; and said message examination program examines a message generated by converting said HTTP message and outputs a request for use of an agent corresponding to said another computer.

9. A storage medium for storing a program for a server to control the activities of agents in a single server system having, in at least one storage location, a plurality to stored deactivated agents which can be activated, said method comprising the steps of:

examining a message generated by a first source agent and addressed to a destination agent by referring to a conversation rule defining usable messages for said single server system, wherein said examining step determines whether said message is invalid and if said message is invalid, requesting the deactivation of said first source agent of the said message and deactivating said first source agent in response to said request;

otherwise, if said message is valid, specifying the destination agent for handling said message as an activation candidate agent based on the said examining step;

referring to the status of active agents; and retrieving said activation candidate agent from said at least one storage location and activating said activation candidate agent if said referring to the status of active agents indicates that the activation candidate agent can be activated.

* * * * *